(12) United States Patent
Wu (10) Patent No.: US 9,316,477 B1
(45) Date of Patent: Apr. 19, 2016

(54) DIGITAL ANGLE FINDER

(71) Applicant: Hsin-Hui Wu, Taichung (TW)

(72) Inventor: Hsin-Hui Wu, Taichung (TW)

(73) Assignee: Hsin-Hui Wu, Taichung (TW)

( * ) Notice: Subject to any disclaimer, the term of this patent is extended or adjusted under 35 U.S.C. 154(b) by 77 days.

(21) Appl. No.: 14/503,418

(22) Filed: Oct. 1, 2014

(51) Int. Cl.
*G01B 7/30* (2006.01)
*G01B 5/24* (2006.01)

(52) U.S. Cl.
CPC ........................................ *G01B 5/24* (2013.01)

(58) Field of Classification Search
CPC ............... G01B 3/56; G01B 5/24; G01B 7/30
USPC ......................................... 33/1 N, 1 PT, 534
See application file for complete search history.

(56) References Cited

U.S. PATENT DOCUMENTS

| 4,513,512 | A  | * | 4/1985  | Fischer  | G01B 3/56   |
|           |    |   |         |          | 33/1 N      |
| 4,897,927 | A  | * | 2/1990  | Nicol    | A61B 5/1071 |
|           |    |   |         |          | 33/512      |
| 4,940,063 | A  | * | 7/1990  | Challis  | G01B 7/30   |
|           |    |   |         |          | 33/512      |
| 6,792,688 | B2 | * | 9/2004  | Busch    | G01B 21/24  |
|           |    |   |         |          | 33/1 N      |
| 8,341,850 | B2 | * | 1/2013  | Merchant | A61B 5/1071 |
|           |    |   |         |          | 33/1 N      |
| 2007/0283587 | A1 | * | 12/2007 | Cerwin | G01B 7/30    |
|           |    |   |         |          | 33/471      |
| 2011/0146094 | A1 | * | 6/2011  | Wu     | G01D 5/04    |
|           |    |   |         |          | 33/534      |
| 2011/0221667 | A1 | * | 9/2011  | Lee    | G01B 7/30    |
|           |    |   |         |          | 345/156      |
| 2013/0221956 | A1 | * | 8/2013  | Kotani | G01B 7/30    |
|           |    |   |         |          | 324/207.25   |
| 2014/0157609 | A1 | * | 6/2014  | Sugamura | G01B 21/22 |
|           |    |   |         |          | 33/1 N       |
| 2014/0191749 | A1 | * | 7/2014  | Bondar | G01B 7/30    |
|           |    |   |         |          | 324/207.13   |
| 2015/0028861 | A1 | * | 1/2015  | Lee    | G01D 5/2086  |
|           |    |   |         |          | 324/207.16   |
| 2015/0033566 | A1 | * | 2/2015  | Chen   | G01D 5/04    |
|           |    |   |         |          | 33/1 PT      |
| 2016/0033255 | A1 | * | 2/2016  | Reese  | G01B 7/22    |
|           |    |   |         |          | 324/671      |

\* cited by examiner

*Primary Examiner* — G. Bradley Bennett
(74) *Attorney, Agent, or Firm* — Yuwen Guo (57) ABSTRACT

A digital angle finder is disclosed and comprises a hollow housing, having a rectangular cross section; a power supply assembly, insertably arranged at a first end of the hollow housing; a digital display screen assembly, arranged on the hollow housing and electrically connected with the power supply assembly; and an angle checking assembly, movably arranged at a second end of the hollow housing opposite to the first end, the angle checking assembly including a contacting surface, an elastic sleeve, and a variable resistor member, the variable resistor member is disposed inside the elastic sleeve, the elastic sleeve is electrically connecting with the digital display screen assembly and the power supply assembly and also movably arranged between the second end of the hollow housing and the contacting surface, and the contacting surface is contacting an angle-checking object.

3 Claims, 7 Drawing Sheets

DIGITAL ANGLE FINDER

FIELD OF THE INVENTION

The present invention relates to a digital angle finder, and more particularly to a digital angle finder featuring a variable resistor member movably arranged at one end of a hollow housing for checking angle and a digital display screen arranged on the hollow housing for showing the checked angle while or before cutting wood.

BACKGROUND OF THE INVENTION

There is often a need to scribe lines from the edge of a piece of lumber or sheet material at a predetermined angle. For example, in framing a roof, the roof rafters must have their ends trimmed so as to establish the pitch angle of the roof to be constructed.

U.S. Pat. No. 4,138,914 issued on Feb. 13, 1979 for a "Saw Guide Apparatus" shows an adjustable saw guide useful for such purpose.

It is sometimes necessary to match an angle existing between two members in order to scribe the same angle on a workpiece. In such cases, any device used for this purpose must be able to be insertable between the members to be adjusted in conformity with the angle existing between these members.

Such guides and adjustable angles are often used for scribing lines on sheet material such as plywood, glass, drywall, etc. preparatory to cutting the same at a predetermined angle between the side edge of the sheet material.

U.S. Pat. No. 4,955,141 issued on Sep. 11, 1990 for "An Adjustable Pivot Angle Square Invention" describes such a general purpose adjustable angle device in which two elongated members are pivotally mounted to each other at one end and with a connecting member pivotally connected at one end to one of the members and sliding within an elongated slot formed in the other member. As the connecting member moves along the slot, varying adjustable angles are formed between the first two pivotally connected members.

See also U.S. Pat. No. 1,906,988 issued on May 2, 1933 for a "Measuring Apparatus" similarly showing a slotted member pinned at one end to a second elongated member with a connecting member pinned to the second member, and having one end attached to a slider moving through the slot. This enables a setting of an angle between the first and second mentioned members.

When such devices are used as a saw guide, a base member must be held against the lumber piece or other material being cut as the saw is advanced across the angled member with the base member being held in an accurately determined positioned as the sawing operation is continued. Oftentimes there is some slight shifting movement resulting from the urging of the saw edge against the member used as the guide, with a resultant loss of accuracy in the cut.

Various digital angle finders are currently available for measuring the tilt or inclination of an object or a work surface. Inclinometer-type angle finders typically feature a generally rectilinear configuration. A digital display screen and operating buttons are mounted on a vertical front face of the device. At least one side surface of the inclinometer functions as a reference surface for engaging the work surface or object to be measured for inclination.

The foregoing angle finders usually exhibit one or more shortcomings. The viewing screen is invariably oriented perpendicular to the ground and can be difficult to view and read clearly from above and/or peripherally. By the same token, positioning the push buttons that operate the finder (for example the ON/OFF and ZERO reference buttons) on the front face of the finder can be problematic. It can be cumbersome to reliably press these buttons and accurately set the ZERO reference point, particularly since the finder tends to slide along the work surface when a button on the front face of the finder is pressed.

Conventional digital angle finders commonly feature two varieties of inclination measurements. The user can choose to employ an absolute zero point and thereby obtain angular measurements relative to the center of the earth. Alternatively, the user can select and employ an incremental zero point that allows angular measurements to be taken relative to any arbitrary reference surface. Conventional finders permit the user to alternate between these two modes by engaging a button to switch the screen display to the desired mode. Switching between absolute and incremental measurements can be confusing and cause the user to record incorrect measurements.

However, if above mentioned digital angle finders are used for the corner of the wall, the angular measurements is hard to be relative to the center of the earth.

SUMMARY OF THE INVENTION

An objective of this invention is providing a digital angle finder. The digital angle finder has simplified structure and small volume. Furthermore, it is easy to operate to check the angle between the work surface and the angle-checking object, such as blade. And the angle value may show on the display screen for real-time reading.

To achieve above objectives, a digital angle finder is provided and comprises a hollow housing, having a rectangular cross section; a power supply assembly, insertably arranged at a first end of the hollow housing; a digital display screen assembly, arranged on the hollow housing and electrically connected with the power supply assembly; and an angle checking assembly, movably arranged at a second end of the hollow housing opposite to the first end, the angle checking assembly including a contacting surface, an elastic sleeve, and a variable resistor member, the variable resistor member is disposed inside the elastic sleeve, the elastic sleeve is electrically connecting with the digital display screen assembly and the power supply assembly and also movably arranged between the second end of the hollow housing and the contacting surface, and the contacting surface is contacting an angle-checking object.

Wherein the hollow housing is positioned on a work surface and the contacting surface is checking and inclined based on an angle of the angle-checking object, the variable resistor member is changing the resistance and then the resistance is transmitting to the digital display screen assembly for transferring an angle value and showing the angle value.

In some embodiment, the power supply assembly includes a holder and at least one battery disposed in the holder.

In some embodiment, the digital display screen assembly includes at least one setting button, a display screen and a processor, the display screen is electrically connected with the processor, the processor is processing the resistance to the angle value, and the at least one setting button is for changing a value showing on the display screen.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Referring now to the drawings where like characteristics and features among the various figures are denoted by like reference characters.

Figure 1:
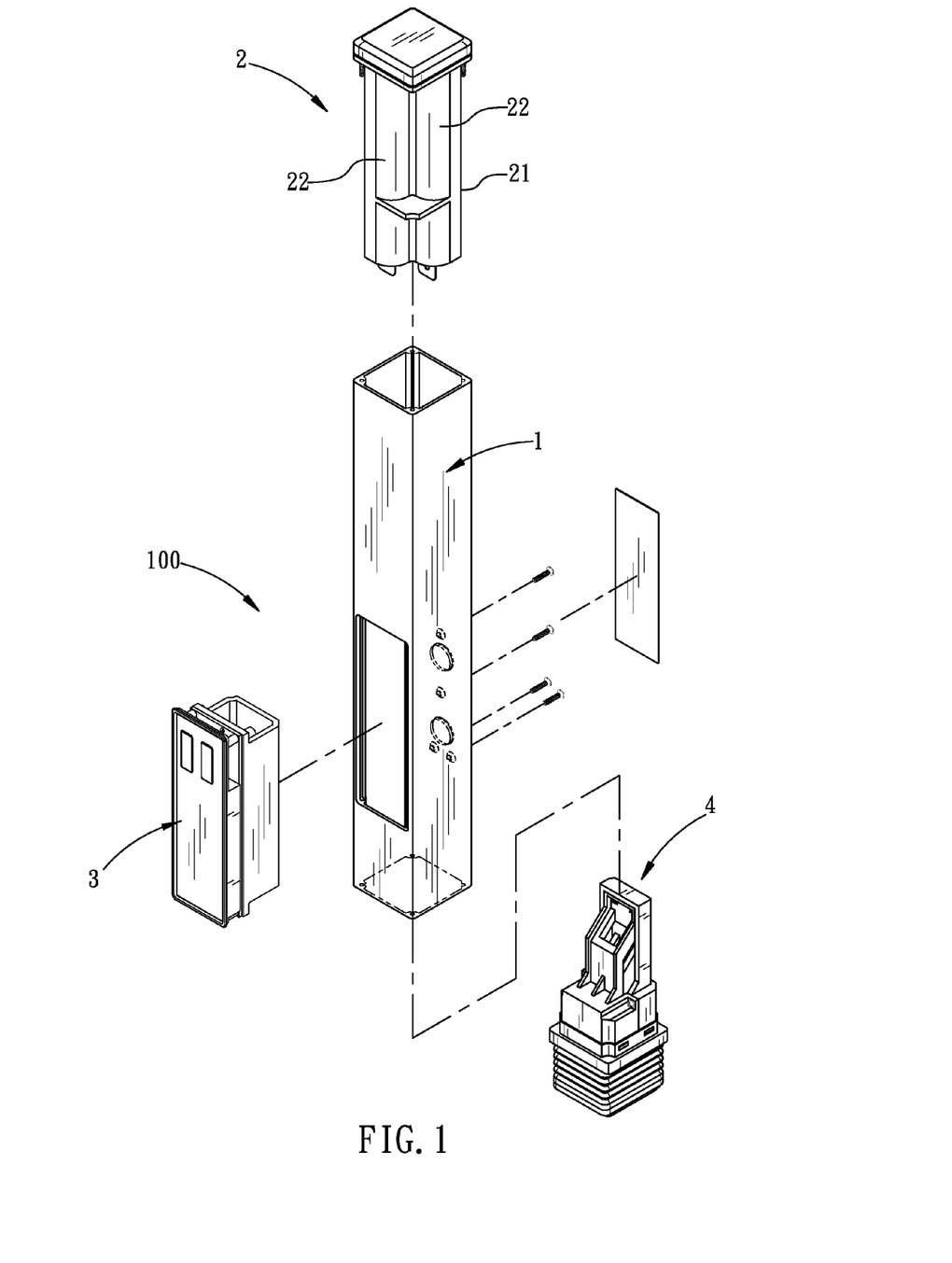
FIG. 1 is an exploded view of a digital angle finder according to an embodiment of present invention.
Figure 2:
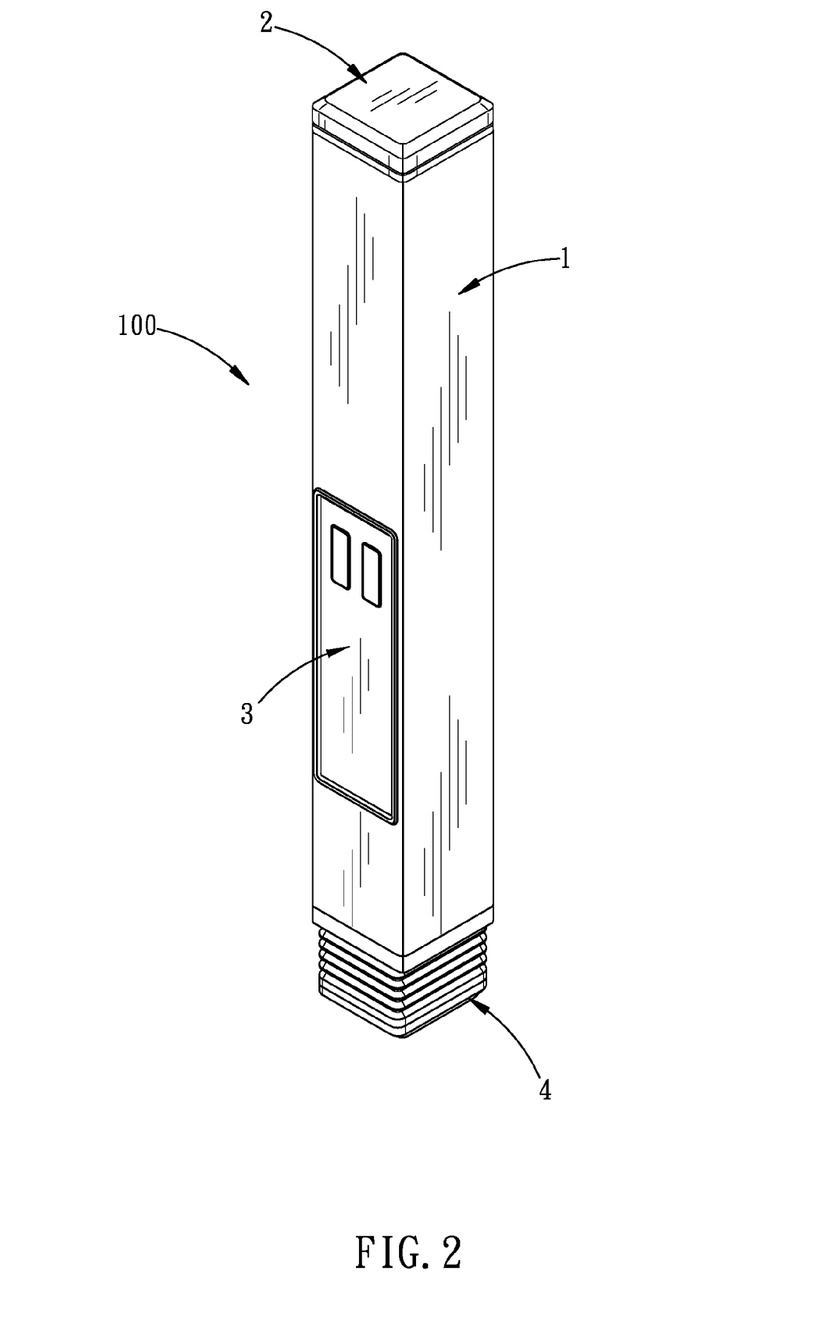
FIG. 2 is a perspective view of the digital angle finder according to the embodiment of present invention.
Figure 3:
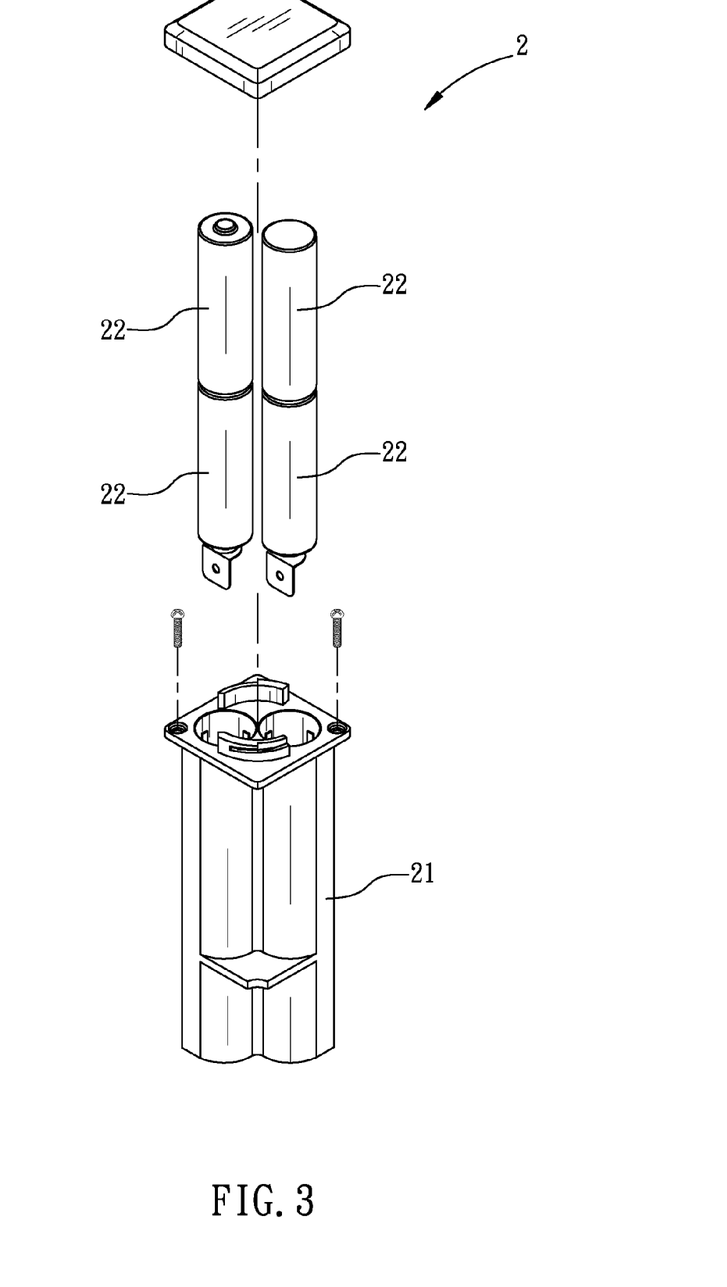
FIG. 3 is an exploded view of the power supply assembly of the digital angle finder according to the embodiment of present invention.
Figure 4:
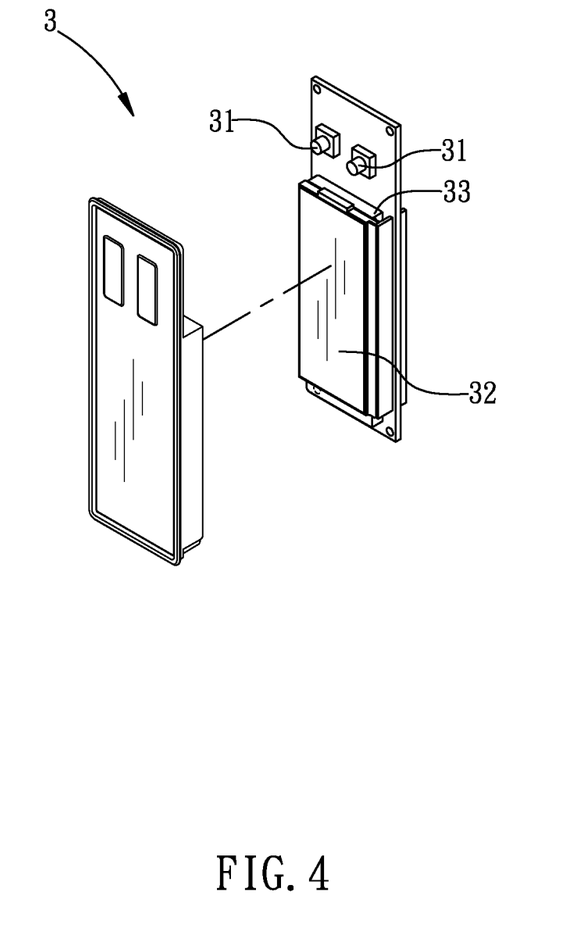
FIG. 4 is a perspective view of the display screen assembly of the digital angle finder according to the embodiment of present invention.
Figure 5:
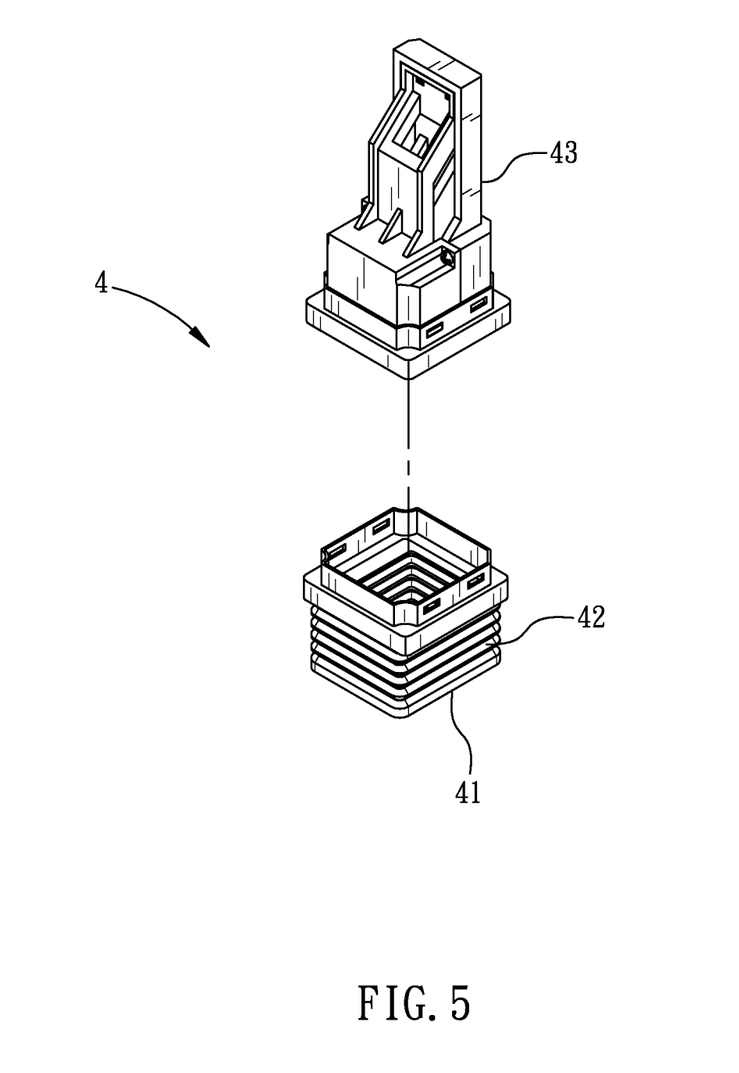
FIG. 5 is a perspective view of the angle checking assembly of the digital angle finder according to the embodiment of present invention.
Figure 6:
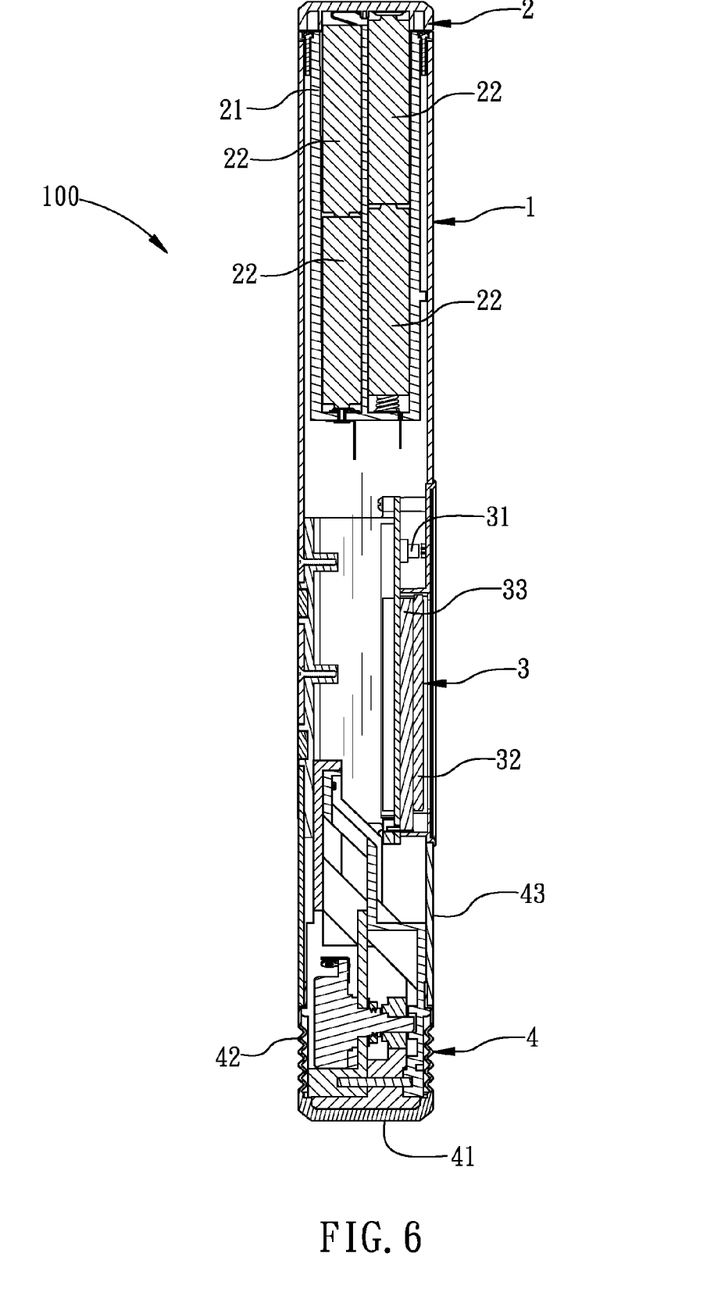
FIG. 6 is a cross-sectional view of the digital angle finder according to the embodiment of present invention.
Figure 7:
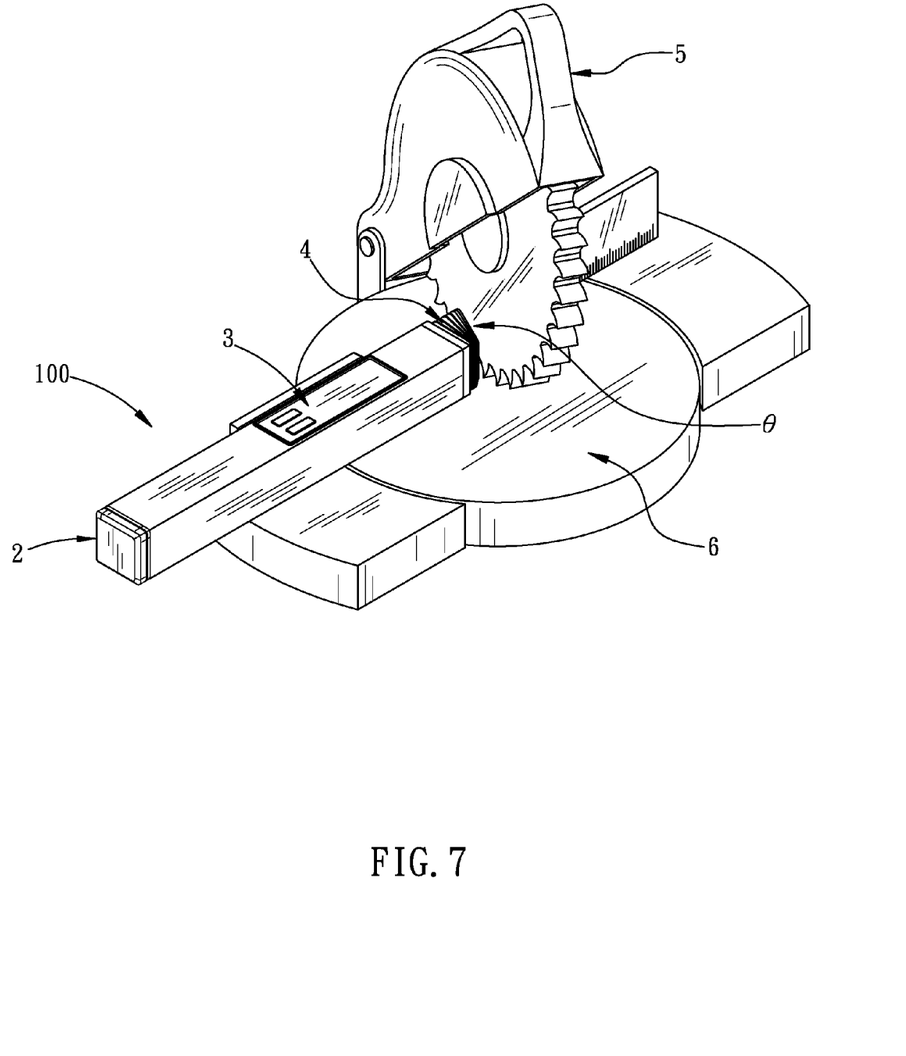
FIG. 7 is a perspective view of the digital angle finder while checking the angle of a blade according to the embodiment of present invention.

FIG. 1 is an exploded view of a digital angle finder according to an embodiment of present invention. FIG. 2 is a perspective view of the digital angle finder according to the embodiment of present invention. FIG. 3 is an exploded view of the power supply assembly of the digital angle finder according to the embodiment of present invention. FIG. 4 is a perspective view of the display screen assembly of the digital angle finder according to the embodiment of present invention. FIG. 5 is a perspective view of the angle checking assembly of the digital angle finder according to the embodiment of present invention. FIG. 6 is a cross-sectional view of the digital angle finder according to the embodiment of present invention. FIG. 7 is a perspective view of the digital angle finder while checking the angle of a blade according to the embodiment of present invention.

Please refer to FIGS. 1 to 7, the digital angle finder 100 of this invention may comprise a hollow housing 1, a power supply assembly 2, a digital display screen assembly 3, and an angle checking assembly 4.

The hollow housing 1 may have at least one flat side, such as one flat surface combined with one arc surface. In this embodiment, the hollow housing 1 has a rectangular cross section, but not limited thereto.

The power supply assembly 2 may be insertably arranged at a first end of the hollow housing 1. The power supply assembly 2 may include a holder 21 and at least one battery 22 disposed in the holder 21. In this embodiment, the at least one battery 22 is four batteries, but not limited thereto.

The digital display screen assembly 3 may be arranged on the hollow housing 1 and electrically connected with the power supply assembly 2.

The angle checking assembly 4 may be movably arranged at a second end of the hollow housing 1 opposite to the first end. The angle checking assembly 4 may include a contacting surface 41, an elastic sleeve 42, and a variable resistor member 43. The variable resistor member 43 may be disposed inside the elastic sleeve 42. The elastic sleeve 42 may be electrically connecting with the digital display screen assembly 3 and the power supply assembly 3, and also movably arranged between the second end of the hollow housing 1 and the contacting surface 41. And the contacting surface 41 may be contacting an angle-checking object 5, such as a blade (shown as in FIG. 7).

The digital display screen assembly 3 may include at least one setting button 31, a display screen 32 and a processor 33. The display screen 32 may be electrically connected with the processor 33. The processor 33 may be processing the resistance to the angle value, and the at least one setting button is for changing a value showing on the display screen.

The at least one setting button 31 may be three buttons, including a ZERO button, a HOLD button, and a POWER ON button. When pressing the ZERO button, the angle value shown on the display screen 32 is "Z" and "0.0". When pressing the HOLD button, the angle value transmitted from the angle-checking assembly 4 and transferred by the processor 33 is kept and shown on the display screen 32 with "H" in front thereof. When pressing the HOLD button longer than 3 seconds, the angle value shown on the display screen 32 is reversed. And then, the angle value shown on the display screen 32 is reversed again while pressing the HOLD button longer than 3 seconds again. Before using the digital angle finder 100, the POWER ON button should be pressed first to activate.

Please refer to FIG. 7, the hollow housing 1 may be positioned on a work surface 6 and the contacting surface 41 may be checking and inclined based on an angle θ of the angle-checking object 5, such as a blade. The variable resistor member 43 may be changing the resistance of the variable resistor member 43, and then the resistance of the variable resistor member 43 may be transmitting to the digital display screen assembly 3 for transferring an angle value and showing the angle value.

Therefore, the digital angle finder 100 has simplified structure and small volume. Furthermore, it is easy to operate to check the angle between the work surface and the angle-checking object, such as blade. And the angle value may show on the display screen for real-time reading.

What is claimed is:

1. A digital angle finder, comprising:
   a hollow housing, having a rectangular cross section;
   a power supply assembly, insertably arranged at a first end of the hollow housing;
   a digital display screen assembly, arranged on the hollow housing and electrically connected with the power supply assembly; and
   an angle checking assembly, movably arranged at a second end of the hollow housing opposite to the first end, the angle checking assembly including a contacting surface, an elastic sleeve, and a variable resistor member, the variable resistor member is disposed inside the elastic sleeve, the elastic sleeve is electrically connecting with the digital display screen assembly and the power supply assembly and also movably arranged between the second end of the hollow housing and the contacting surface, and the contacting surface is contacting an angle-checking object;
   wherein the hollow housing is positioned on a work surface and the contacting surface is checking and inclined based on an angle of the angle-checking object, the variable resistor member is changing the resistance and then the resistance is transmitting to the digital display screen assembly for transferring an angle value and showing the angle value.

2. The digital angle finder as claimed in claim 1, wherein the power supply assembly includes a holder and at least one battery disposed in the holder.

3. The digital angle finder as claimed in claim 1, wherein the digital display screen assembly includes at least one setting button, a display screen and a processor, the display screen is electrically connected with the processor, the processor is processing the resistance to the angle value, and the at least one setting button is for changing a value showing on the display screen.

* * * * *